US008711956B2

(12) United States Patent
Wadsworth (10) Patent No.: US 8,711,956 B2
(45) Date of Patent: Apr. 29, 2014

(54) MODIFIED CONTINUOUS PHASE MODULATION COMMUNICATIONS SYSTEM AND RELATED METHODS

(75) Inventor: Michael A. Wadsworth, Palmyra, NY (US)

(73) Assignee: Harris Corporation, Melbourne, FL (US)

( * ) Notice: Subject to any disclaimer, the term of this patent is extended or adjusted under 35 U.S.C. 154(b) by 383 days.

(21) Appl. No.: 13/022,398

(22) Filed: Feb. 7, 2011

(65) Prior Publication Data

US 2012/0202429 A1 Aug. 9, 2012

(51) Int. Cl.
*H04L 27/00* (2006.01)

(52) U.S. Cl.
USPC ........... 375/259; 375/265; 375/320; 375/268; 375/300; 375/286; 455/42; 332/106; 332/115; 332/149

(58) Field of Classification Search
CPC .. H03C 5/00; H04L 27/201; H04L 25/03834; H04L 27/18; H04L 25/4917; H04L 27/2003; H04L 27/22; H03K 7/00; H03M 13/13; H04B 14/02
USPC .......................... 370/200–546; 375/130–377; 455/1–899; 332/106, 115, 149
See application file for complete search history.

(56) References Cited

U.S. PATENT DOCUMENTS

| | | | |
|---|---|---|---|
| 4,365,338 A | 12/1982 | McRae et al. | 375/12 |
| 4,750,192 A | 6/1988 | Dzung | 375/67 |
| 4,962,756 A | 10/1990 | Shamir et al. | 128/26 |
| 5,440,573 A | 8/1995 | Fermann | 372/18 |
| 6,148,040 A | 11/2000 | Nguyen et al. | 375/326 |
| 6,389,079 B2 * | 5/2002 | Raheli et al. | 375/262 |
| 6,771,713 B1 * | 8/2004 | Lui et al. | 375/326 |
| 6,862,324 B1 * | 3/2005 | Lui et al. | 375/326 |
| 7,054,658 B1 | 5/2006 | Lobo | 455/553.1 |
| 7,302,016 B1 | 11/2007 | Rice et al. | 375/329 |
| 7,369,631 B1 * | 5/2008 | Gifford et al. | 375/346 |
| 7,433,430 B2 | 10/2008 | Wadsworth et al. | 375/343 |
| 7,508,884 B2 | 3/2009 | Nieto et al. | 375/295 |
| 7,636,399 B2 * | 12/2009 | Brown et al. | 375/260 |

(Continued)

OTHER PUBLICATIONS

M. M R. Shane and R. D. Wesel, "Reduced Complexity Iterative Demodulation and Decoding of Serial Concatenated Continuous Phase Modulation" Nov. 2001, IEEE Signals, Systems and Computers, vol. 1, pp. 285-289.*

(Continued)

*Primary Examiner* — Daniel Washburn
*Assistant Examiner* — Amneet Singh
(74) *Attorney, Agent, or Firm* — Allen, Dyer, Doppelt, Milbrath & Gilchrist, P.A.

(57) ABSTRACT

A communications system may include a first communications device that may include a transmitter and a modulator cooperating therewith to modulate a coded waveform using a constant phase modulation (CPM) to generate a non-linear CPM waveform, and generate a linear representation of the non-linear CPM waveform, the linear representation including a plurality of pulses. The transmitter and a modulator may further cooperate to remove at least some of the plurality of pulses to define a modified linear representation of the non-linear CPM waveform, and transmit the modified linear representation of the non-linear CPM waveform. The communications system may further include a second communications device that may include a receiver and a single pulse-matched filter linear demodulator cooperating therewith to demodulate the modified linear representation of the non-linear CPM waveform transmitted from the first communications device.

14 Claims, 7 Drawing Sheets

(56) References Cited

U.S. PATENT DOCUMENTS

| | | | |
|---|---|---|---|
| 7,684,497 B2* | 3/2010 | Green | 375/242 |
| 2004/0213351 A1* | 10/2004 | Shattil | 375/260 |
| 2005/0286653 A1* | 12/2005 | Lai et al. | 375/308 |
| 2006/0215786 A1 | 9/2006 | Nieto et al. | 375/305 |
| 2007/0002986 A1 | 1/2007 | Green | 375/353 |
| 2008/0056407 A1* | 3/2008 | Green et al. | 375/302 |
| 2008/0118002 A1* | 5/2008 | Fonseka et al. | 375/298 |
| 2010/0034318 A1* | 2/2010 | Lui et al. | 375/324 |
| 2010/0195769 A1* | 8/2010 | Green | 375/320 |
| 2010/0309959 A1* | 12/2010 | Lakkis | 375/150 |
| 2010/0310009 A1* | 12/2010 | Lakkis | 375/308 |
| 2011/0188613 A1* | 8/2011 | Dowling et al. | 375/320 |

OTHER PUBLICATIONS

M. R. Shane and R. D. Wesel, "Reduced Complexity Iterative Demodulation and Decoding of Serial Concatenated Continuous Phase Modulation" Nov. 2001, IEEE Signals, Systems and Computers, vol. 1, pp. 285-289.*

Wylie-Green, M.P., "A New PAM Decomposition for Continuous Phase Modulation," Information Sciences and Systems, 2006 40th Annual Conference on , vol., no., pp. 705,710, Mar. 22-24, 2006.*

Perrins, E.; Rice, M., "Optimal and reduced complexity receivers for M-ary multi-h CPM," Wireless Communications and Networking Conference, 2004. WCNC. 2004 IEEE , vol. 2, no., pp. 1165,1170 vol. 2, Mar. 21-25, 2004.*

Xiaojing Huang; Yunxin Li, "The PAM decomposition of CPM signals with integer modulation index," Communications, IEEE Transactions on , vol. 51, No. 4, pp. 543,546, Apr. 2003.*

Mengali, U.; Morelli, M., "Decomposition of M-ary CPM signals into PAM waveforms," Information Theory, IEEE Transactions on , vol. 41, No. 5, pp. 1265,1275, Sep. 1995.*

Laurent, P., "Exact and Approximate Construction of Digital Phase Modulations by Superposition of Amplitude Modulated Pulses (AMP)," Communications, IEEE Transactions on , vol. 34, No. 2, pp. 150,160, Feb. 1986.*

Rice et al., "Estimation Techniques for GMSK Using Linear Detectors in Satellite Communications", IEEE Transactions on Aerospace and Electronic Systems, vol. 43, No. 4, Oct. 2007, pp. 1484-1495.

Wylie-Green, "A New PAM Decomposition for Continuous Phase Modulation", Proceedings of the Annual Princeton Conference on Information Sciences and Systems, Mar. 2006, pp. 1-6.

Ghassan K. Kaleh, Simple Coherent Receivers for Partial Response Continuous Phase Modulation, Dec. 1989, pp. 1427-1436.

Umberto Mengali, Decomposition of M-ary CPM Signals into PAM Waveforms, Sep. 1995, pp. 1265-1275.

Giulio Colavolpe, Reduced-Complexity Detection and Phase Synchronization of CPM Signals, Aug. 2002, pp. 1437-1449.

Pierre A. Laurent, Exact and Approximate Construction of Digital Phase Modulations by Superposition of Amplitude Modulated Pulses (AMP), Feb. 1986, pp. 150-160.

* cited by examiner

MODIFIED CONTINUOUS PHASE MODULATION COMMUNICATIONS SYSTEM AND RELATED METHODS

FIELD OF THE INVENTION

The present invention relates to the field of communications systems, and more particularly, to communications systems and related methods that use continuous phase modulation schemes.

BACKGROUND OF THE INVENTION

A small-form-factor may be beneficial for a mobile wireless communications device. A small-form-factor mobile wireless communications device may support relatively high spectral efficiencies, for example, 1 bit per second per Hertz (bps/Hz) or greater. Relatively high spectral efficiencies may provide improved performance in certain networking applications, such as, for example, downloading a video.

A small-form-factor mobile wireless communications device typically benefits from a waveform having a zero dB or near-zero dB peak-to-average ratio. In addition, a radio transmitter that may be included in a small-form-factor mobile wireless communications device may be peak power limited.

A lower peak-to-average ratio may allow the transmitter to operate with a higher effective radiated power at a given peak transmit power level. Thus, using a lower peak-to-average waveform, a small-form-factor mobile wireless communications device may have increased output power and thus throughput at a given range. Alternatively, a small-form-factor mobile wireless communications device using a lower peak-to-average waveform may maintain throughput at a given range with a lower peak transmit power level to provide increased battery life, and/or may allow the use of smaller and/or cheaper transmitter components.

To support higher spectral efficiencies, a small-form-factor mobile wireless communications device may consider size, weight, power, and cost implications of a receiver in addition to the transmitter. Receive signal processing requirements may often be related to the transmitted signal. For example, a receiver for processing of a non-linearly modulated continuous phase modulated (CPM) waveform may be more complex and include more components (increased size and weight, and cost) than a receiver for processing a linearly modulated waveform.

A type of high spectral efficiency modulation scheme is Nyquist-shaped quadrature amplitude modulation (QAM), which typically supports 1-3 bps/Hz using up to 5 bits per symbol and forward error correction, and typically has a 4-6 dB peak-to-average ratio. A QAM modulated waveform may use a single symbol-matched filter for demodulation, and a minimum mean squared error (MMSE) criterion non-linear decision feedback equalizer for channel equalization.

Minimum shift keying (MSK), Gaussian minimum shift keying (GMSK), and shaped offset quadrature phase shift keying are lower spectral efficiency modulation schemes that generally provide less than 1.25 bps/Hz with forward error correction, use up to 1 bit per symbol, and have a 0 dB peak-to-average ratio. An MSK waveform typically uses either a single non-pulse-matched filter and a maximum likelihood sequence estimate (MLSE) equalizer, or a single Laurent-approximation pulse matched filter and an MMSE-criterion equalizer.

Quasi-bandlimited minimum shift keying is yet another lower spectral efficiency modulation scheme that may provide less than 1 bps/Hz, 1 bit per symbol, and a 0.5 dB peak-to-average ratio. A single non-pulse-matched filter and an MLSE equalizer are typically used for demodulation.

Continuous phase modulation (CPM) is a high spectral efficiency modulation scheme that may provide up to 1-2 bps/Hz using 2 bits per symbol, and has a 0 dB peak-to-average ratio. A single non-pulse-matched filter and an MLSE equalizer are typically used for demodulation.

However, each of the above-noted modulation schemes have shortcomings. For example, QAM modulation generally requires highly-linear transmit amplification due to its large peak-to-average ratio. However, the comparatively lower peak-to-average ratio MSK and CPM modulations generally require comparatively more complicated MLSE-based demodulation. These shortcomings may result in a mobile wireless communications device being larger, heavier, more expensive, and having a shorter battery life than may be desired.

U.S. Patent Application Publication No. 2007/0002986 to Green is directed to an apparatus for representing an inherently non-linear CPM waveform as a linear pulse amplitude modulated (PAM) waveform that is the superposition of $Q_0 \leq 2^{L-1}$ PAM component pulses in each symbol interval such that 95% or preferably 98% of signal energy over each symbol interval is preserved.

SUMMARY OF THE INVENTION

In view of the foregoing background, it is therefore an object of the present invention to provide a reduced complexity CPM communications system.

This and other objects, features, and advantages in accordance with the present invention are provided by a communications system that includes a first communications device that includes a transmitter and a modulator cooperating therewith which are operable to modulate a coded waveform using a constant phase modulation (CPM) to generate a non-linear CPM waveform, and generate a linear representation of the non-linear CPM waveform, the linear representation including a plurality of pulses. The transmitter and modulator further cooperate to remove at least some of the plurality of pulses to define a modified linear representation of the non-linear CPM waveform, and transmit the modified linear representation of the non-linear CPM waveform. The communications system further includes a second communications device that includes a receiver and a single pulse-matched filter linear demodulator cooperating therewith operable to demodulate the modified linear representation of the non-linear CPM waveform transmitted from the first communications device. Accordingly, the communications system provides CPM based communications that can be demodulated using linear demodulation techniques, thus resulting in a reduced complexity communications system.

A method aspect is directed to a communications method that includes modulating, in a first communications device, a coded waveform using a constant phase modulation (CPM) to generate a non-linear CPM waveform, and generate a linear representation of the non-linear CPM waveform, the linear representation including a plurality of pulses. The method further includes removing at least some of the plurality of pulses to define a modified linear representation of the non-linear CPM waveform, and transmitting the modified linear representation of the non-linear CPM waveform. The method further includes demodulating the modified linear representation of the non-linear CPM waveform transmitted from the first communications device in a second communications device that includes a single pulse filter linear demodulator.

As such, the communications device may provide a relatively low peak-to-average ratio, high-spectral-efficiency M-ary modulation scheme that, unlike prior CPM complexity reduction schemes, is based upon a reduction in complexity at the modulator. The complexity may be reduced by transmitting a portion of a linear M-ary CPM representation to allow demodulation using a single symbol matched filter and a low-complexity MMSE-criterion equalizer, for example.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
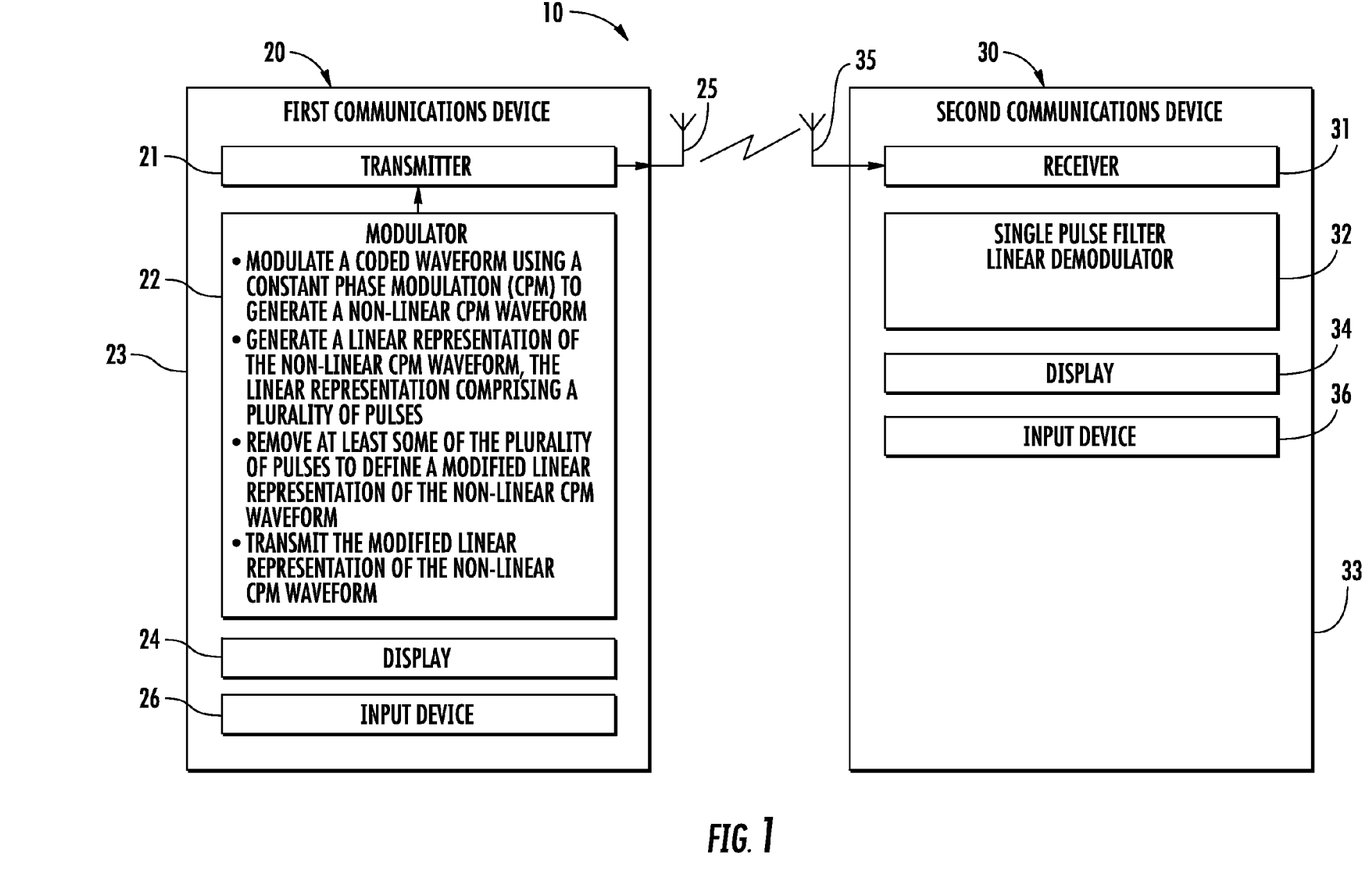
FIG. 1 is a schematic block diagram of a communications system in accordance with the present invention.
Figure 2:
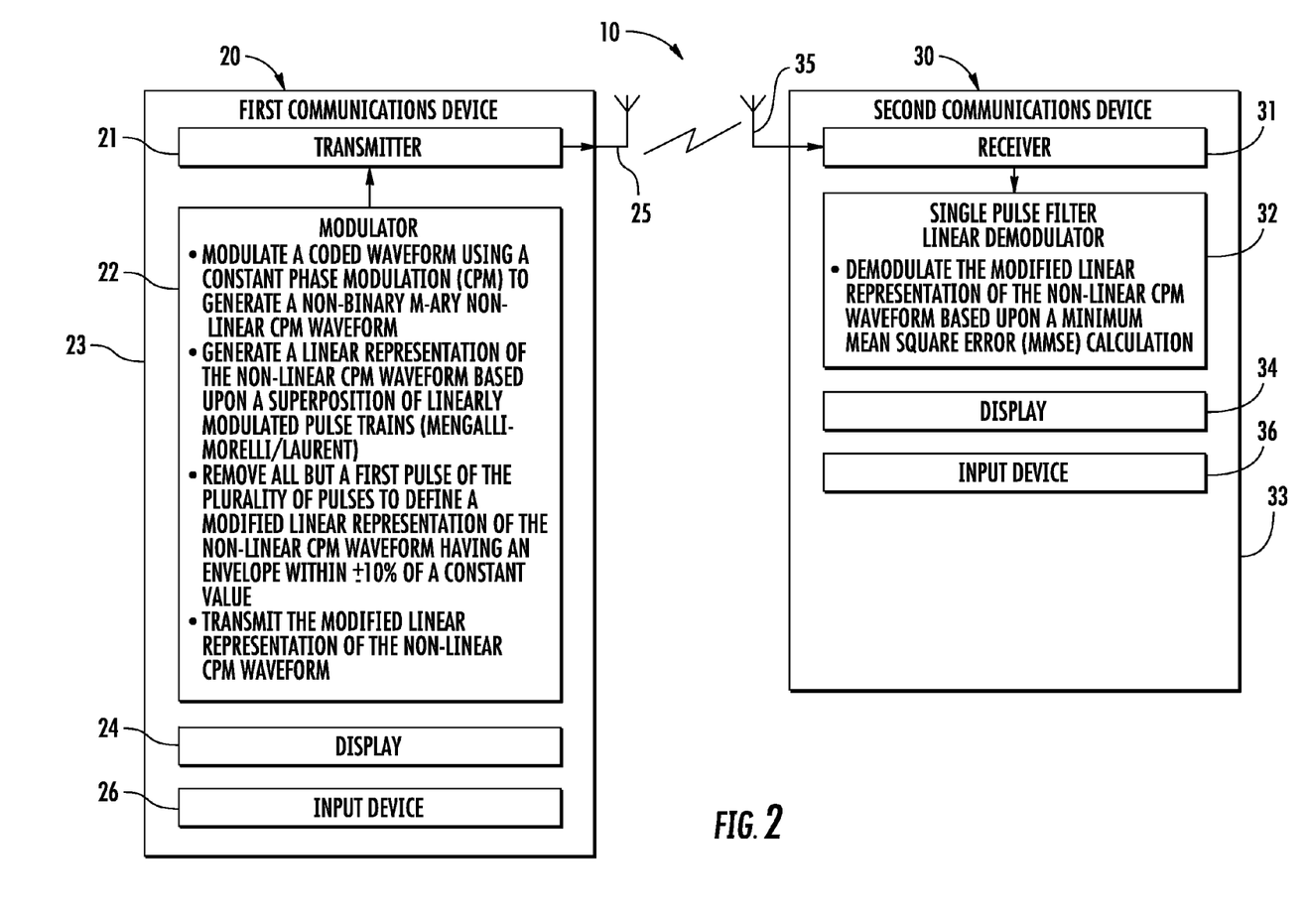
FIG. 2 is a more detailed schematic block diagram of the communications system of FIG. 1.

Referring initially to FIGS. 1-2, a communications system 10 includes a first communications device 20. The first communications device 20 includes a transmitter 21 and a modulator 22. For example, the first communications device 20 may be a Falcon® III radio product available from Harris Corporation, the assignee of the present application. The first communications device 20 also includes a display 24, an input device 26 carried by a housing 23, and an antenna 25 cooperating with the transmitter 21. Other components may also be included in the first communications device 20. The first communications device 20 may be a handheld mobile wireless communications device, or other type of communications device, for example.

The modulator 22 cooperates with the transmitter 21 to modulate a coded waveform using a constant phase modulation (CPM) to generate a non-binary, non-linear CPM waveform. As will be appreciated by those skilled in the art, CPM advantageously has a 0 dB peak-to-average ratio and supports increased spectral efficiency. A CPM signal may be expressed as:

$$S(t) = \exp\left(j\pi h \sum_{n=-\infty}^{\infty} a_n \phi(t - nt)\right)$$

where $a_n$ are the M-ary CPM symbols to be modulated, $\Phi(t)$ is a monotonically increasing phase shaping function having values between 0 and 1, and h is the modulation index, for example, similar to a frequency modulation (FM) deviation value.

As a non-linear modulation scheme that produces a non-linear waveform, with reference to the equation above, $S(a_1 + a_2) \neq S(a_1) + (a_2)$. Additionally, phase is a linear function of a, but S is not linear due to non-linear exp( ) function.

The non-linear nature of CPM generally requires the use of more complicated demodulation techniques. For example, maximum likelihood sequence estimation (MLSE) equalizers may be required that become exponentially more complex as delay spread tolerance and spectral efficiency, for example, increase.

The modulator 22 also generates a linear representation of the non-linear CPM waveform, the linear representation including a plurality of pulses. More particularly, the linear representation may include a plurality of linearly modulated pulse trains and the linear representation is generated based upon a superposition of a finite number of the linearly modulated pulse trains, as will be appreciated by those skilled in the art. For example, a linear representation of the non-linear CPM waveform may be:

$$S(t, \bar{a}) = \sum_{k=0}^{N-1} \sum_{n} a_{k,n} g_k(t - nT)$$

Where $\alpha$ is the vector of CPM symbols; N is the total number of pulses in the linear representation; $g_k(t)$, where k=0, 1, ..., N−1, include the pulse set; and $a_{k,n}$ are the pulse modulation values for pulse k at time n, which are determined from $\alpha$.

The number of pulses, N, is typically affected by the amount of memory in the CPM modulation scheme, and the number of bits per CPM symbol. As will be appreciated by those skilled in the art, the linear representation of the M-ary (e.g. where M>2) non-linear CPM waveform may be based upon a Mengali-Morelli decomposition of the non-linear CPM waveform. Alternatively, the linear representation of the non-linear CPM waveform may be based upon a Laurent decomposition of the non-linear CPM waveform. Other decompositions may be used, for example, the Huang and Li decomposition.

Figure 3:
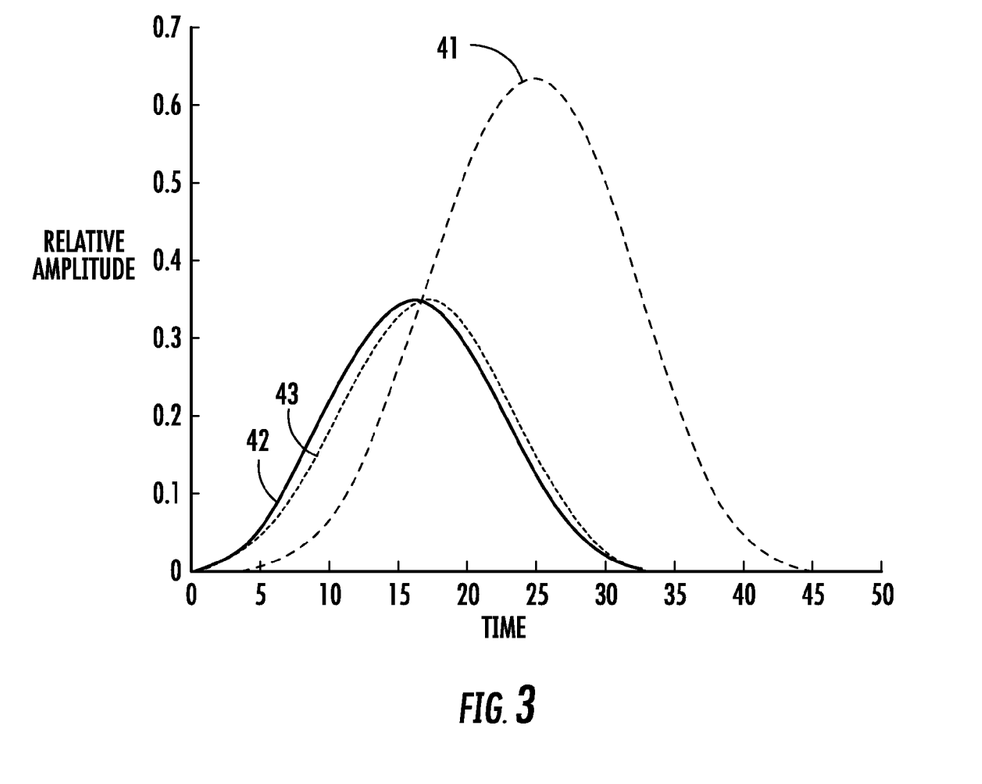
FIG. 3 is a graph illustrating the first three pulses of a linear CPM representation in accordance with the present invention.

Referring additionally to the graph of FIG. 3, there is typically a main, higher-energy 'Laurent' pulse, or pulse set along with a plurality of additional lower-energy pulses. More particularly, pulse 0 typically has the most energy, and pulse N−1 typically has the least energy. However, pulse 0, the main pulse, may include less than 75% of the total energy of the summed pulse trains. The summed pulse trains of 0 through N−1, which are the linear representation of the non-linear CPM waveform, correspond to an equivalent CPM symbol.

The graph of FIG. 3 illustrates the three first Laurent pulses for an exemplary 4-ary CPM modulation scheme. Pulse 0 41 illustratively has the highest amplitude or most energy. Pulses 1 and 2 42, 43 have less energy.

The modulator 22 removes at least some of the plurality of pulses to define a modified linear representation of the non-linear CPM waveform. More particularly, the modulator 22 is configured to remove all but a first pulse (pulse 0) of the plurality of pulses to define the modified linear representation of the non-linear CPM waveform. In other words, multiple different sets of pulses are being generated, and some of the sets are being selected and sent or transmitted.

This linear CPM representation, with modified values for $a_{k,n}$, advantageously creates a CPM-like signal having a near-constant envelope, which allows a demodulator to use techniques based on the assumption that the modulator is a linear process ($a_k=0$, $k\neq 0$). Accordingly, the demodulation may use a single pulse-matched filter linear demodulator 32. For example, such a demodulator may demodulate using a data directed equalization (DDE) technique, as disclosed in U.S. Pat. No. 4,365,338 to McRae et al., assigned to Harris Corporation of Melbourne, Fla., the assignee of the present application, and the entire contents of which are herein incorporated by reference.

The modulator 22 cooperates with the transmitter 21 to transmit the modified linear representation of the non-linear CPM waveform. The transmitter may be an ultra-high frequency (UHF) or high frequency (HF) transmitter, for example. Of course, the transmitter 21 may operate at other frequencies.

The modified linear representation of the non-linear CPM waveform may support 1-2 bps/Hz, 2 bits/symbol, and have a peak-to-average ratio of 1 dB, for example. Compared to traditional non-linear CPM, which has a peak-to-average ratio of 0 dB, 1 dB of the peak-to-average ratio is being traded for a reduction in receiver complexity. Indeed, a reduction in receiver complexity may correspond to reduction in receiver weight and cost, and an increase in battery life, for example in the case of a portable handheld communications device.

A second communications device 30 includes a receiver 31 and the single pulse-matched filter linear demodulator 32 cooperating therewith to demodulate the modified linear representation of the non-linear CPM waveform transmitted from the first communications device 20. The second communications device 30 may be a mobile wireless communications device, for example, a portable handheld radio, and may include a display 34 and an input device 36, carried by a housing 33, and an antenna 35 cooperating with the receiver 31. Alternatively, the second communications device 30 may not be a handheld radio and may be another type of communications device.

The receiver 31 may also be a UHF or an HF receiver, for example, or may operate at other frequencies. The demodulator 32 avoids a filter bank, and includes a single pulse-matched filter. In other words, the demodulator 32 is configured to expect the main pulse, or pulse 0. A MLSE equalizer is typically not required for demodulation of the main pulse, and an MMSE-criterion equalizer may be used instead. Further details of an exemplary receiver may be found in U.S. Pat. Nos. 7,508,884 and 7,508,884, both of which are assigned to Harris Corporation, the assignee of the present application, and the entire contents of both of which are herein incorporated by reference.

In contrast, as will be appreciated by those skilled in the art, for a prior art receiver based upon a linear-CPM representation, each pulse received is typically demodulated by a separate and different filter. Thus, if, for example, three pulses are received and demodulated, three filters may be used to demodulate the waveform in such a prior art device.

The components of the second communications device 30, i.e. the receiver 31 and the demodulator 32, may also be included with the first communications device 20 and vice versa. In other words, the first and second communications devices 20, 30 may include components for modulate/transmit and receive/demodulate operations.

Figure 4:
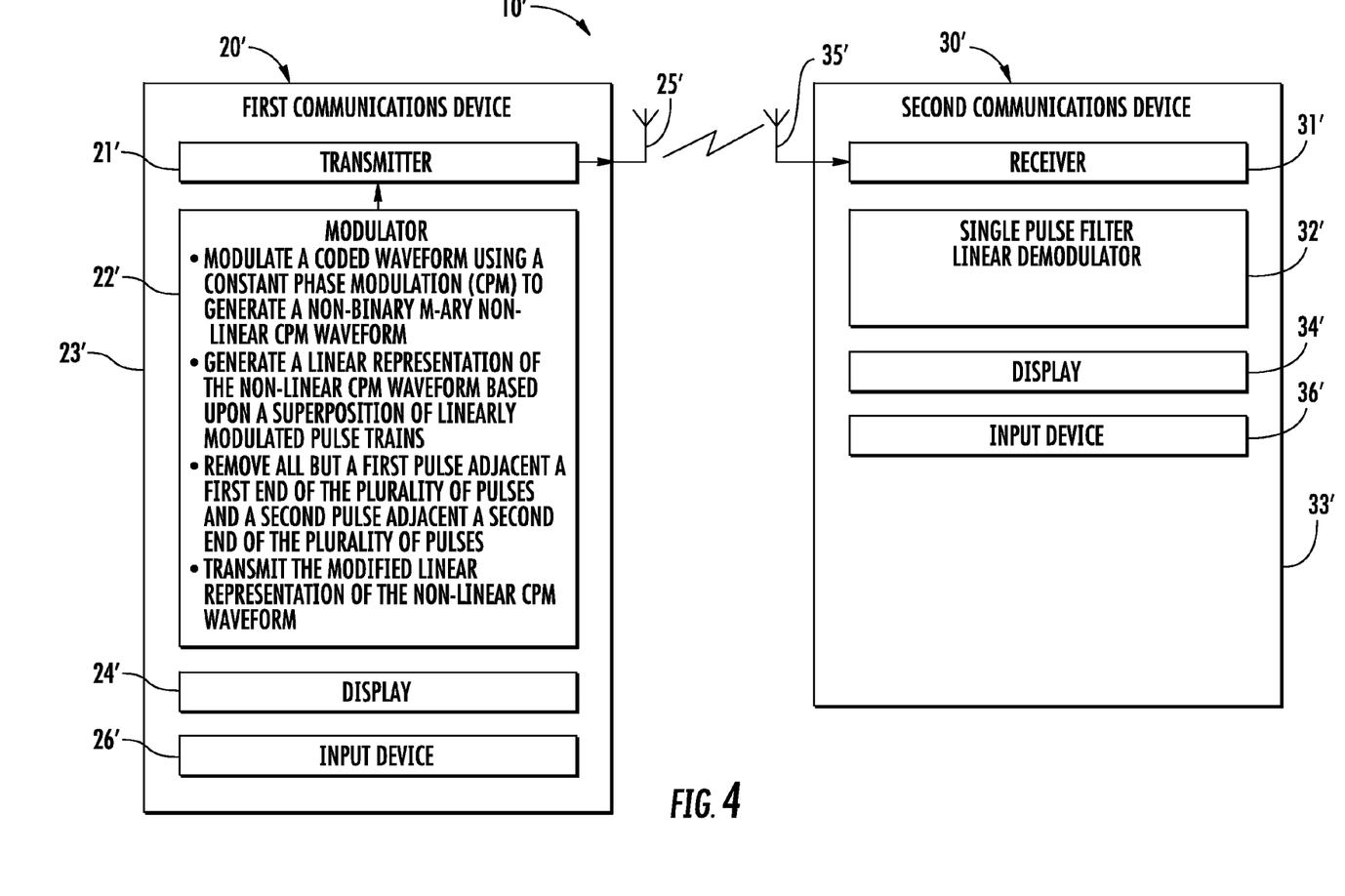
FIG. 4 is a schematic block diagram of another embodiment of the communications system of FIG. 1.

Referring now to FIG. 4, in another embodiment, the modulator 22' may be configured to remove all but a first pulse adjacent a first end of the plurality of pulses and a second pulse adjacent a second end of the plurality of pulses. As will be appreciated by those skilled in the art, the first pulse or pulse train (pulse 0) typically includes more energy than the other pulses (FIG. 3). An additional pulse near the second end, for example, pulse N-1 (not shown), may add a negligible amount of energy to the main pulse to still create a CPM-like signal having a near-constant envelope, for example, within ±20% of a constant value. The additional pulse near the second end also still allows a single pulse-matched filter linear demodulator to demodulate the modified CPM waveform.

Figure 5:
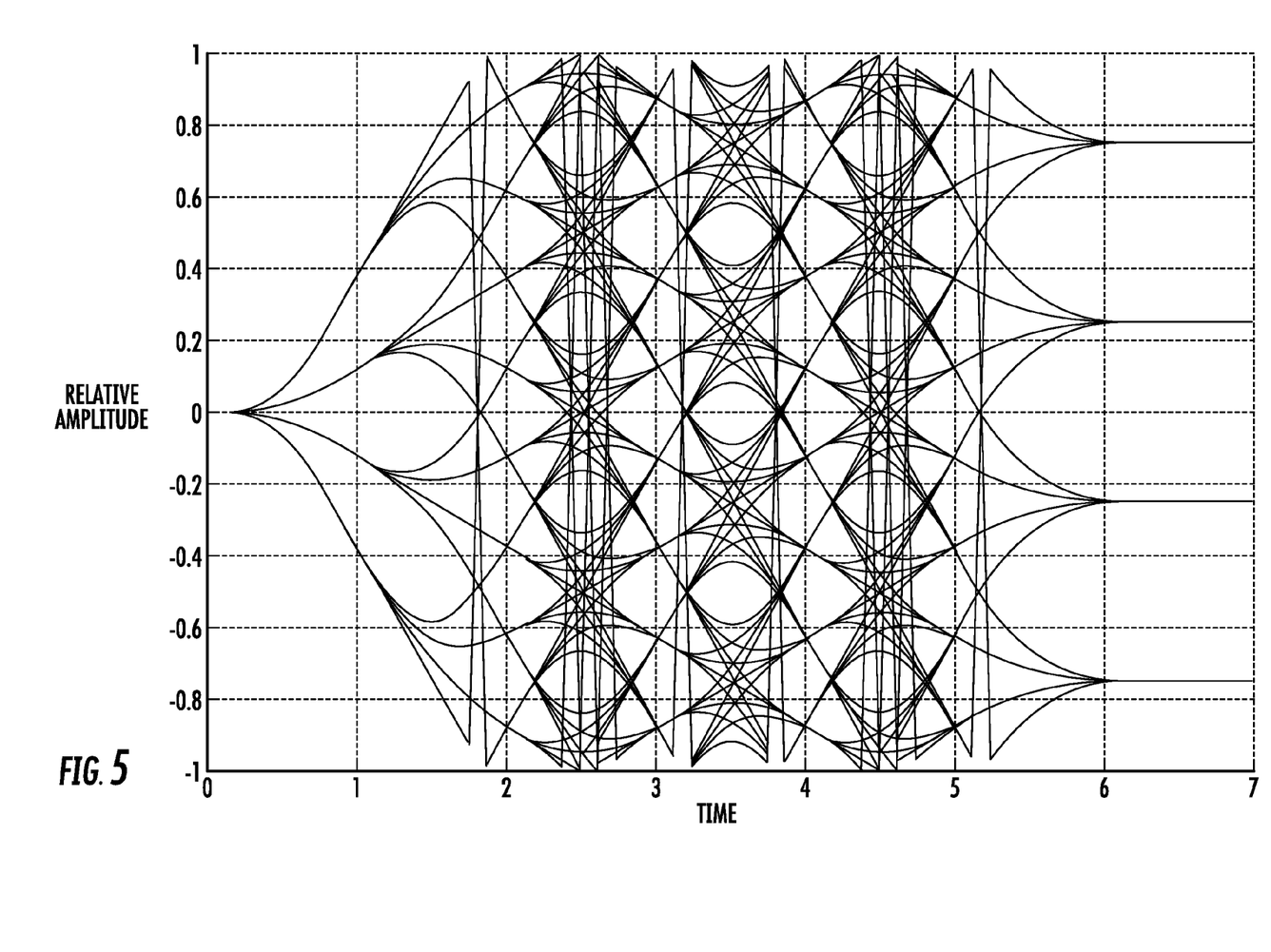
FIG. 5 is a graph illustrating phase trajectories of an example 4-ary, h=1/4 CPM representation in accordance with the present invention.
Figure 6:
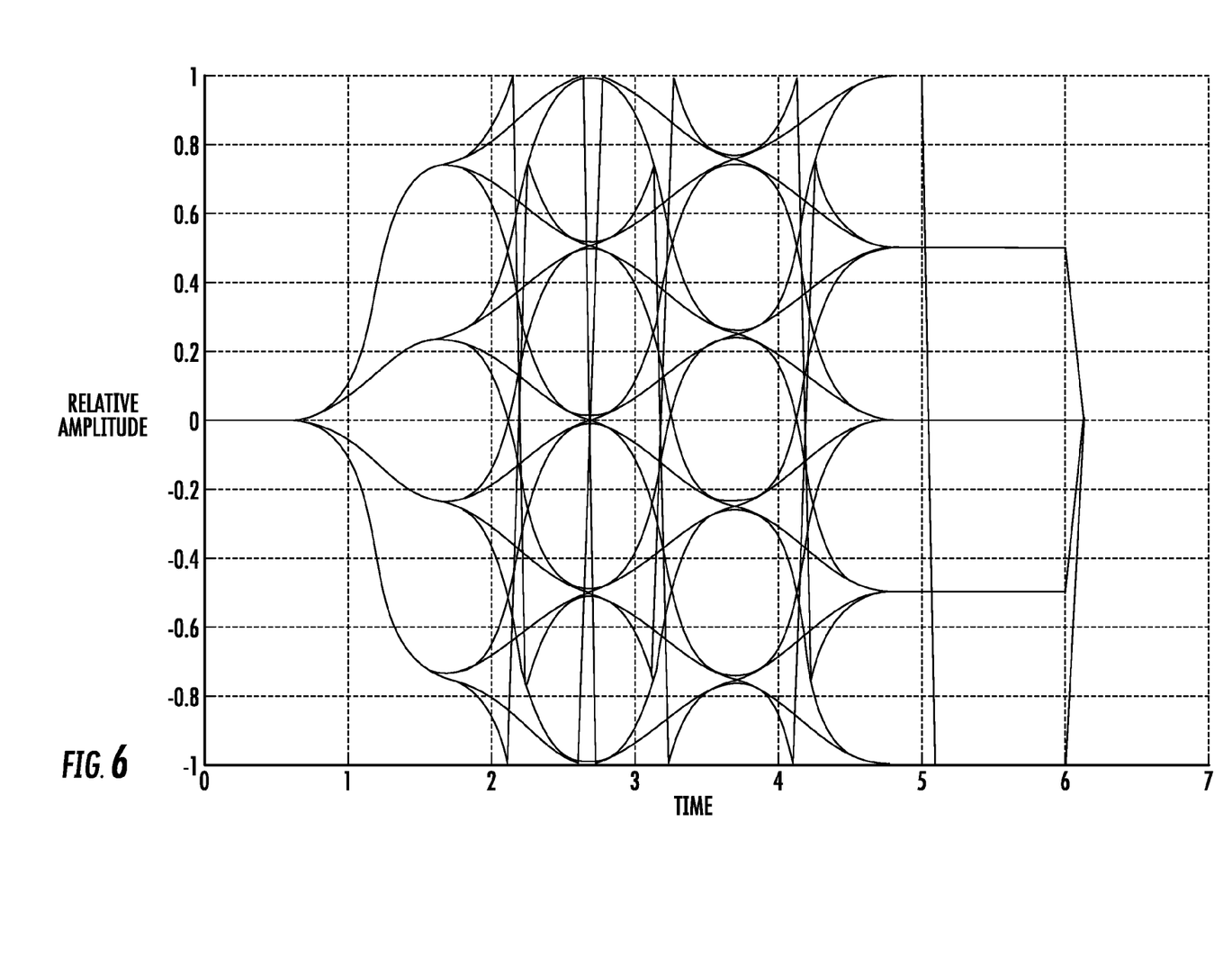
FIG. 6 is a graph illustrating a simplified phase trajectory of a 4-ary waveform in accordance with the present invention.

Referring to the graphs in FIGS. 5 and 6, phase trajectories, which may be illustrative of receiver complexity, are illustrated. The graph of FIG. 5 illustrates phase trajectories of an example 4-ary CPM scheme. The graph of FIG. 6 illustrates a phase trajectory of only the main pulse of FIG. 5. As will be appreciated by those skilled in the art, the phase trajectory illustrated in graph of FIG. 6 can be more easily processed by a receiver and demodulator.

The communications system 10 may improve performance of any peak-power-limited communications system compared to a communications system currently using increased peak-to-average Nyquist-shaped signaling for increased spectral efficiencies. Indeed, the first wireless communications device 20 creates a near-constant-envelope signal, yet allows a demodulator to use techniques that assume the modulator is a linear process, for example, the single pulse-matched filter linear demodulator 32.

A relatively small peak-to-average ratio is thus traded for a relatively large reduction in receiver complexity. For example, when the modified linear representation of the non-linear CPM waveform is transmitted over a dispersive channel, a minimum mean square error (MMSE) criterion decision feed back equalization (DFE) or the Harris DDE technique may be used instead of a more complex MLSE-criterion equalization/demodulation technique.

Thus, the communications system 10 advantageously includes several dB, for example, 2-3 dB, of system gain in peak-power-limited systems relative to currently used Nyquist-shaped signaling. The communications system 10 also provides reduced receiver implementation complexity with comparable power efficiency, for example, a reduction in field programmable gate array (FPGA) utilization in the receiver, reduced power dissipation, and overall reduction of receiver cost relative to a conventional or linear representation-based CPM receiver. Moreover, the communications system 10 allows enhanced delay spread tolerance for a given level of FPGA utilization and power dissipation.

Figure 7:
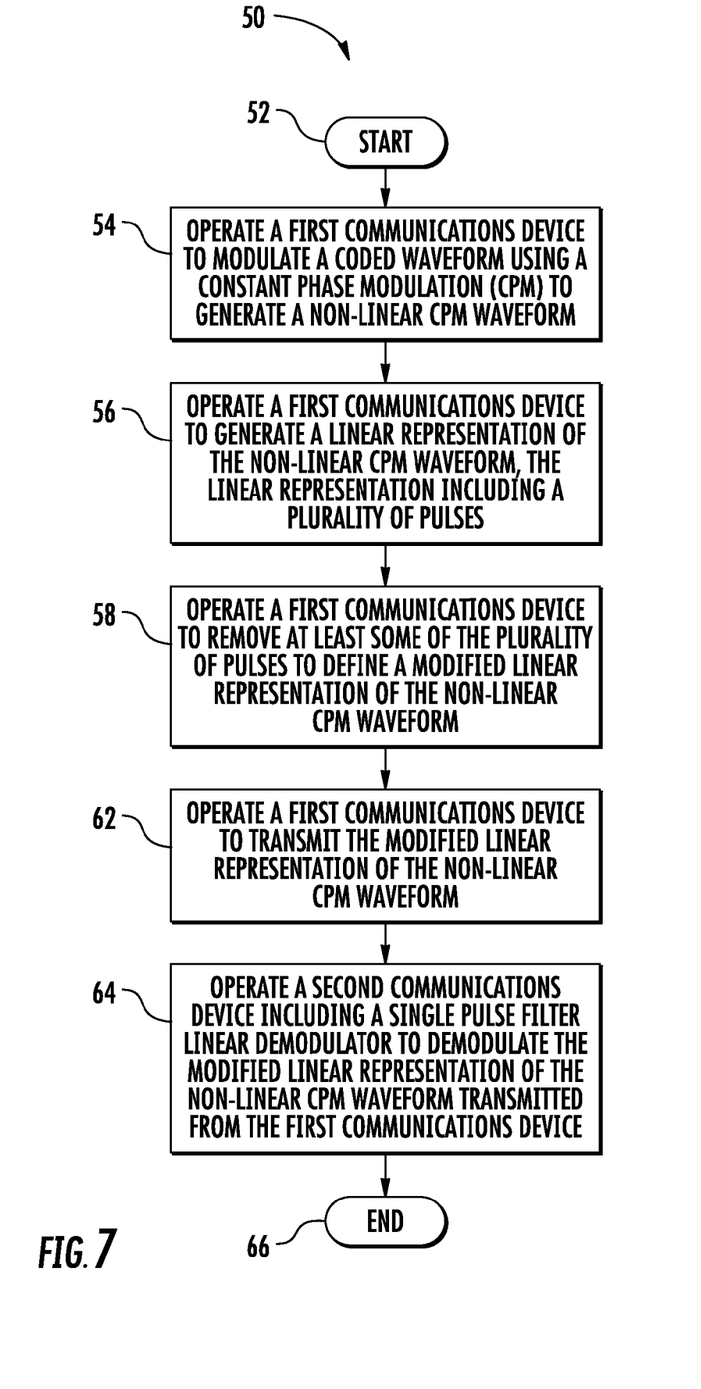
FIG. 7 is a flowchart illustrating a method of a communications method in accordance with the present invention.

Referring now to the flowchart 50 in FIG. 7, beginning at Block 52, a method aspect includes modulating by a first communications device 20, a coded waveform using a CPM to generate a non-linear CPM waveform (Block 54). The first communications device 20 may be operated to modulate the first communications device 20. The method further includes at Block 56 generating a linear representation of the non-linear CPM waveform. The linear representation includes a plurality of pulses. The first communications device 20 may be operated to generate the linear representation.

The method further includes at Block 58 removing at least some of the plurality of pulses to define a modified linear representation of the non-linear CPM waveform. The first communications device 20 may be operated to remove the at least some pulses. At Block 62, the modified linear representation of the non-linear CPM waveform is transmitted. The first communications device 20 may transmit the modified linear representation.

At Block 64, the modified linear representation of the non-linear CPM waveform transmitted, from the first communications device 20, for example, is demodulated. The modified linear representation is demodulated in a second communications device 30 including a single pulse-matched filter linear demodulator 32. The second communications device 30 may be operated to demodulate the modified linear representation. The method ends at Block 66.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
    a first communications device comprising a transmitter and a modulator cooperating therewith and configured to
        modulate a coded waveform using a constant phase modulation (CPM) to generate a non-linear CPM waveform,
        generate a linear representation of the non-linear CPM waveform, the linear representation comprising a plurality of pulses,
        remove all but a first pulse adjacent a first end of the plurality of pulses and a second pulse adjacent a second end of the plurality of pulses to define a modified linear representation of the non-linear CPM waveform, the first and second pulses having at least one pulse therebetween, and
        transmit the modified linear representation of the non-linear CPM waveform; and
    a second communications device comprising a receiver and a single pulse-matched filter linear demodulator cooperating therewith and configured to demodulate the modified linear representation of the non-linear CPM waveform transmitted from said first communications device.

2. The communications system according to claim 1, wherein said modulator is configured to modulate the coded waveform using CPM to generate a non-binary M-ary non-linear CPM waveform.

3. The communications system according to claim 1, wherein said modulator is configured to generate the linear representation of the non-linear CPM waveform based upon a superposition of linearly modulated pulse trains.

4. The communications system according to claim 1, wherein said modulator is configured to generate the modified linear representation of the CPM waveform to have an envelope within ±20% of a constant value.

5. The communications system according to claim 1, wherein said single pulse-matched filter linear demodulator is configured to demodulate the modified linear representation of the non-linear CPM waveform based upon a minimum mean square error (MMSE) criterion.

6. The communications system according to claim 1, wherein said modulator is configured to generate the linear representation of the non-linear CPM waveform based upon a Mengali-Morelli decomposition of the non-linear CPM waveform.

7. A communications device operable for communicating with another communications device comprising a receiver and a single pulse-matched filter linear demodulator cooperating therewith, the communications device comprising:
    a transmitter and a modulator cooperating therewith and configured to
        modulate a coded waveform using a constant phase modulation (CPM) to generate a non-linear CPM waveform,
        generate a linear representation of the non-linear CPM waveform, the linear representation comprising a plurality of pulses,
        remove all but a first pulse adjacent a first end of the plurality of pulses and a second pulse adjacent a second end of the plurality of pulses to define a modified linear representation of the non-linear CPM waveform, the first and second pulses having at least one pulse therebetween, and
        transmit the modified linear representation of the non-linear CPM waveform.

8. The communications device according to claim 7, wherein said modulator is configured to modulate the coded waveform using CPM to generate a non-binary M-ary non-linear CPM waveform.

9. The communications device according to claim 7, wherein said modulator is configured to generate the linear representation of the non-linear CPM waveform based upon a superposition of linearly modulated pulse trains.

10. A communications device operable to communicate with another communications device comprising a transmitter and a modulator cooperating, the communications device comprising:
    a receiver configured to receive a linear representation of a non-linear CPM waveform generated by modulating a coded waveform using a constant phase modulation (CPM) to generate the non-linear CPM waveform, the linear representation comprising a plurality of pulses and all but a first pulse adjacent a first end of the plurality of pulses and a second pulse adjacent a second end of the plurality of pulses being removed to define a modified linear representation of the non-linear CPM waveform, the first and second pulses having at least one pulse therebetween; and
    a single pulse-matched filter linear demodulator coupled to said receiver and cooperating therewith to demodulate the modified linear representation of the received non-linear CPM waveform.

11. The communications device according to claim 10, wherein said single pulse-matched filter linear demodulator is configured to demodulate the modified linear representation of the non-linear CPM waveform based upon a minimum mean square error (MMSE) criterion.

12. A communications method comprising:
    modulating by a first communications device a coded waveform using a constant phase modulation (CPM) to generate a non-linear CPM waveform;
    generating, at the first communications device, a linear representation of the non-linear CPM waveform comprising a plurality of pulses;
    removing all but a first pulse adjacent a first end of the plurality of pulses and a second pulse adjacent a second end of the plurality of pulses to define a modified linear representation of the non-linear CPM waveform, the first and second pulses having at least one pulse therebetween; and transmitting the modified linear representation of the non-linear CPM waveform; and demodulating the modified linear representation of the non-linear CPM waveform transmitted from the first communications device in a second communications device comprising a single pulse filter linear demodulator.

13. The method according to claim 12, wherein modulating the coded waveform comprises modulating the coded waveform using CPM to generate a non-binary M-ary non-linear CPM waveform.

14. The method according to claim 12, wherein generating the linear representations comprises generating the linear representation of the non-linear CPM waveform based upon a superposition of linearly modulated pulse trains.

* * * * *